United States Patent [19]

Hyatt

[11] Patent Number: 4,759,101

[45] Date of Patent: Jul. 26, 1988

[54] APPARATUS FOR HOLDING SMALL GAME ANIMALS OR FISH DURING SKINNING, SCALING OR BUTCHERING OPERATIONS

[76] Inventor: Billy Hyatt, 1512 Hodges Rd., Ruston, La. 71270

[21] Appl. No.: 119,967

[22] Filed: Nov. 13, 1987

[51] Int. Cl.⁴ .............................................. A22B 1/00
[52] U.S. Cl. .......................................... 17/70; 17/44.3
[58] Field of Search .................. 17/44, 44.2, 70, 44.3; 294/79, 80, 86.29, 103.1, 104, 118

[56] References Cited

U.S. PATENT DOCUMENTS

| | | | |
|---|---|---|---|
| 1,655,301 | 1/1928 | Williams | 294/80 |
| 1,928,126 | 9/1933 | Fried | 17/44 |
| 2,536,268 | 1/1951 | Dillon | 17/44 |
| 2,653,347 | 9/1953 | Diekman | 17/44 |
| 3,194,599 | 7/1965 | Ambill | 17/44.2 X |
| 3,245,107 | 4/1966 | Kolman | 17/44 |

Primary Examiner—Willie G. Abercrombie
Attorney, Agent, or Firm—Donald A. Kettlestrings

[57] ABSTRACT

Apparatus for holding small game animals or fish during skinning, scaling or butchering operations is provided. The apparatus includes a support member defining an upper serrated surface and a plurality of arm members pivotally mounted to the support member and to each other whereby movement of the members in relationship to each other enlarges or diminishes the size of a triangular opening bounded by serrated surfaces.

9 Claims, 2 Drawing Sheets

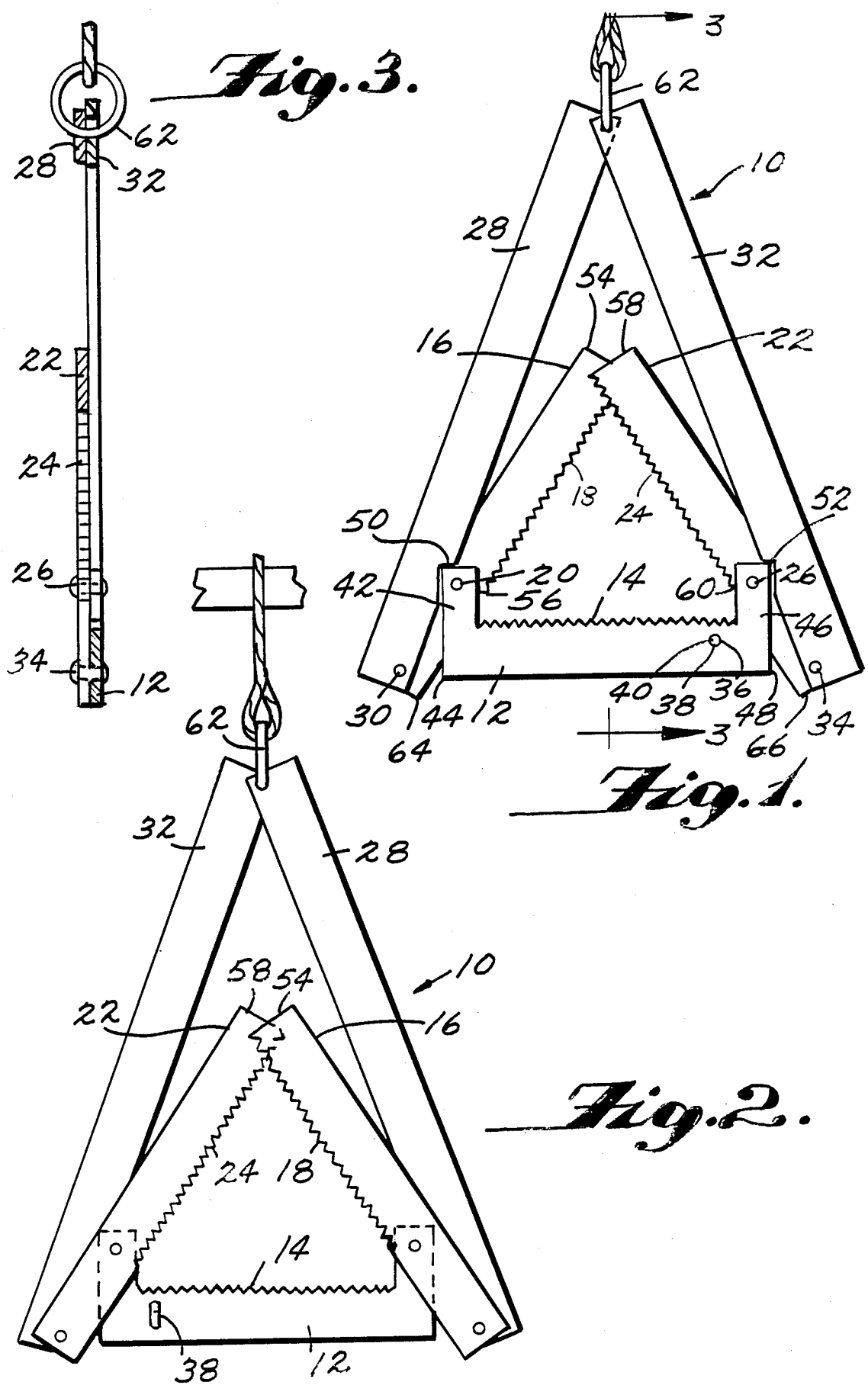

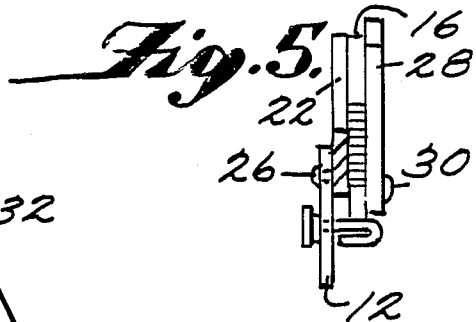
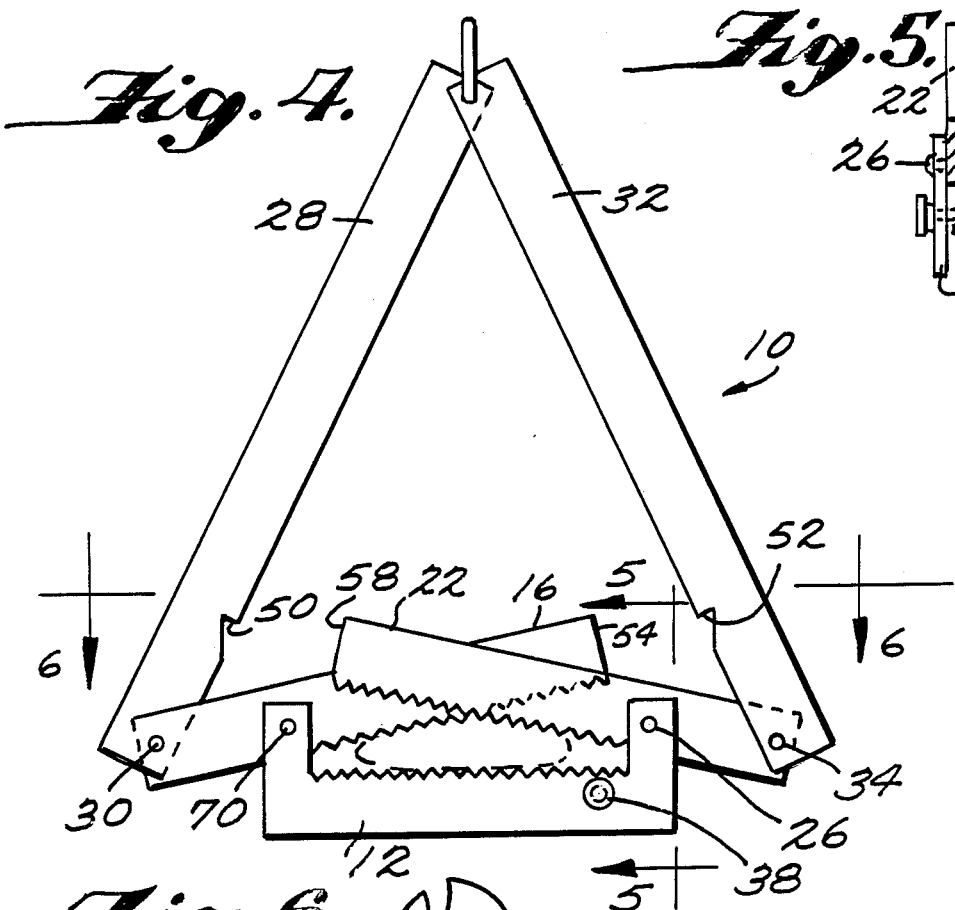
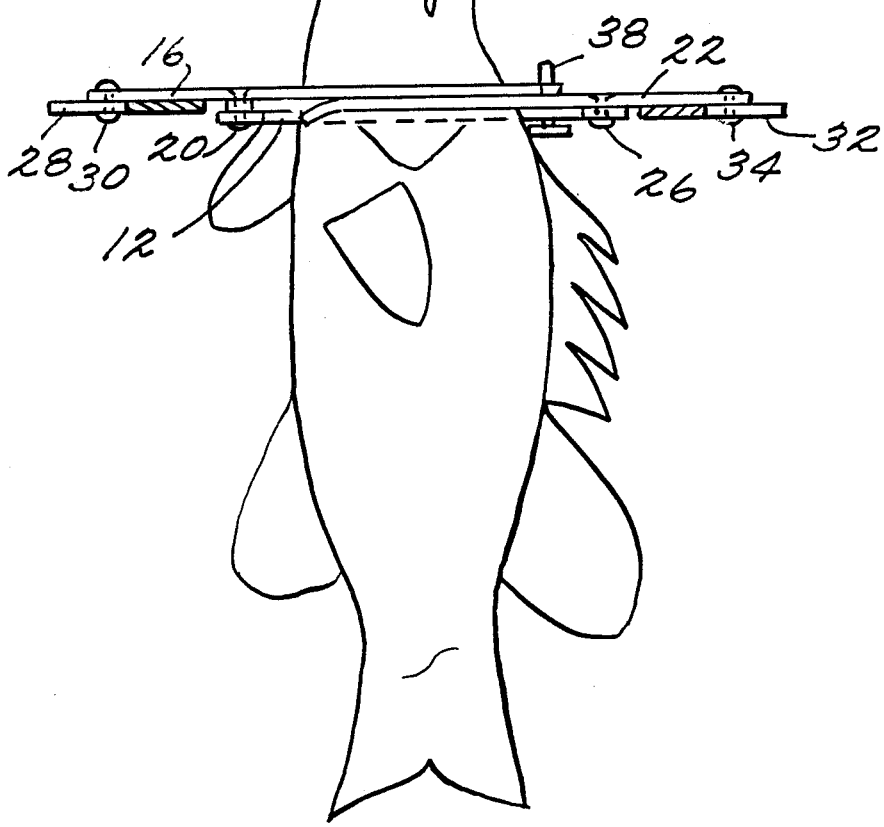

APPARATUS FOR HOLDING SMALL GAME ANIMALS OR FISH DURING SKINNING, SCALING OR BUTCHERING OPERATIONS

This invention relates to apparatus for holding small game animals or fish and more particularly to such apparatus for holding small game animals or fish during skinning, scaling or butchering operations.

An object of the present invention is the provision of apparatus for holding small game during skinning operations.

Another object is to provide such an apparatus for holding fish during scaling operations.

A further object of the invention is the provision of such an apparatus for holding small game animals or fish during butchering operations.

Still another object is to provide such an apparatus which is simple in construction and inexpensive to manufacture and maintain.

Yet another object of the present invention is the provision of such an apparatus which will grip the animal or fish with greater force as one pulls harder on the animal or fish during the skinning, scaling or butchering operation.

A still further object is to provide such an apparatus which is easily adjustable to hold animals or fish of different sizes.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides such an apparatus which includes a support member defining an upper serrated surface; a first arm member, defining a first lower serrated surface, pivotally mounted to the support member for enabling selective positioning of the serrated surfaces in juxtaposed relationship with each other; a second arm member, defining a second lower serrated surface, pivotally mounted to the support member for enabling selective positioning of the upper serrated surface and the second lower serrated surface in juxtaposed relationship with each other; a third arm member pivotally attached to the first arm member; and a fourth arm member pivotally attached to the second arm member and to the third arm member, whereby movement of the members in relationship to each other enlarges or diminishes the size of a triangular opening bounded by the serrated surfaces.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a front elevation view of the apparatus and illustrating the apparatus in the maximum-open position;

FIG. 2 is a rear elevation view of the apparatus in an open position;

FIG. 3 is a sectional view of the apparatus taken along the line 3—3 in FIG. 1 and looking in the direction of the arrows;

FIG. 4 is a front elevation view of the apparatus and illustrating the apparatus in a partially closed position grasping a fish;

FIG. 5 is a fragmentary cross sectional view of the apparatus taken along the line 5-5 in FIG. 4 and looking in the direction of the arrows; and FIG. 6 is a cross sectional view of the apparatus taken along the line 6—6 in FIG. 4 and looking in the direction of the arrows.

With reference now to the drawings, wherein like reference characters designate like or corresponding parts throughout the several views, there is shown apparatus 10 in accordance with this invention for holding small game animals or fish during skinning, scaling or butchering operations. Apparatus 10 includes a support member 12 defining an upper serrated surface 14. A first arm member 16 defines a first lower serrated surface 18, and arm member 16 is pivotally mounted to support member 12 by means of pin or rivet 20 for enabling selective positioning of serrated surfaces 14, 18 in juxtaposed relationship with each other.

Apparatus 10 further includes a second arm member 22 which defines a second lower serrated surface 24. Arm member 22 is pivotally mounted to support member 12 by pin or rivet 26 for enabling selective positioning of serrated surfaces 14, 24 in juxtaposed relationship with each other. Approximately one and one-half inches of arm member 22 adjacent to first end 58 is slightly bent so that serrated surface 24 contacts serrated surface 14 when the triangular opening bounded by serrated surfaces 14, 18 and 24 is closed.

A third arm member 28 is pivotally attached to first arm member 16 by pin or rivet 30, and a fourth arm member 32 is pivotally attached to second arm member 22 by pin or rivet 34, whereby movement of members 12, 18, 24, 28 and 32 in relationship to each other enlarges or diminishes the size of a triangular opening bounded by serrated surfaces 14, 18 and 24.

In accordance with the invention, means 36 are provided in operative relationship with support member 12 and with arm member 16 for limiting the range of relative movement between serrated surfaces 14 and 18. More specifically, movement limiting means 36 include a nail or screw 38 or the like positioned within opening 40 in support member 12. Nail 38 is preferably shaped in a substantially U-shaped configuration, as best shown in FIG. 5, for holding the nail within opening 40. Nail 38 contacts serrated surface 18 when members 12, 16, 22, 28 and 32 are moved into predetermined positions with respect to each other and when the triangular opening bounded by serrated surfaces 14, 18 and 24 is closed.

Preferably, support member 12 includes a first element 42 projecting upwardly from a first end 44 of support member 12 and a second element 46 projecting upwardly from a second end 48 of support member 12. First arm member 16 is connected in pivotal relationship to first element 42 by pin or rivet 20 and second arm member 22 is connected in pivotal relationship with second element 46 by pin or rivet 26.

In accordance with the invention, third arm member 28 defines a first notch 50 therein, and fourth arm member 32 defines a second notch 52 therein whereby first notch 50 contacts first element 42 and second notch 52 contacts second element 46 when members 12, 16, 22, 28 and 32 are moved in relationship to each other to form the largest possible triangular opening bounded by serrated surfaces 14, 18 and 24. Notches 50, 52 permit arm members 16, 22 to move further with respect to support member 12 in an upward and outward direction so that a larger triangular opening bounded by serrated surfaces 14, 18 and 24 can be created.

Upper serrated surface 14 preferably extends between first element 42 and second element 46 to create a lower gripping surface upon which the animal or fish is positioned. Serrated surface 18 preferably extends between a first end 54 of first arm member 16 and a position 56 on first arm member 16 adjacent to where arm member 16 is pivotally connected to first element 42. Similarly, serrated surface 24 preferably extends between a first end 58 of second arm member 22 and a position 60 on second arm member 22 adjacent to where arm member 22 is pivotally connected to second element 46. Thus, a triangular gripping area of adjustable size is provided for gripping or grasping the animal or fish between serrated surfaces 14, 18 and 24.

In operation, apparatus 10 is suspended from a support by means of a wire, screw, loop or nail 62 which also pivotally connects together arm members 28, 32. First arm members 16, 22 are slightly bent to permit them to move freely in side-by-side relationship with each other, and all members 12, 16, 22, 28 and 32 can be freely moved in relationship to the other members.

Typically, apparatus 10 can be suspended from a support, such as a post, fence or tree so that the apparatus is positioned approximately five feet above the ground. Support member 12 is pushed upwardly, and a triangular opening bounded by serrated surfaces 14, 18 and 24 is created. The opening can also be created by pulling or pushing upwardly on arm members 16 and 22. Any part of the animal or fish is then placed through the opening and onto serrated surface 14. Pulling down on the game or fish or on support member 12 causes arm members 16, 22 to rotate downwardly against the animal or fish. The animal or fish is then gripped within the triangular opening bounded by serrated surfaces 14, 18 and 24.

Because of the lever action created by apparatus 10, the harder one pulls on the game or fish in a downward direction and during the skinning, scaling or butchering operation, the more lever action is produced and the more holding force is produced by support member 12 and by arm members 16, 22. The more the game or fish is pulled in a downward direction the more holding force is applied to the game or fish. The weight of the game or fish alone within apparatus 10 will also create enough force and lever action to hold the game or fish within the triangular area bounded by serrated surfaces 14, 18 and 24. Thus, the game or fish will be held in place by apparatus 10 even if one is not applying a pulling force to the game or fish.

To remove the game or fish from apparatus 10, a slight upward push against the game or fish or against support member 12 will enlarge the triangular opening bounded by serrated surfaces 14, 18 and 24. The triangular opening can also be enlarged to release the game or fish by pulling or pushing upwardly on arm members 16, 18.

When apparatus 10 is manipulated to grasp the game or fish, the lower ends of arm members 28, 32 move outwardly and away from support member 12. Simultaneously, ends 54, 58 of arm members 16, 22 move downwardly, and lower ends 64, 66 of arm members 16, 22 respectively, move upwardly. Support member 12 also moves in a downward direction but not as far nor as quickly as ends 54, 58 of arm members 16, 22. Nail or screw 38 acts as a stop so that arm member 16 will not rotate downwardly beyond a predetermined position with respect to support member 12. When apparatus 10 is empty, serrated surface 18 can rest upon nail or screw 38. Arm member 22 is shaped so that serrated surface 24 adjacent to end 58 of arm member 22 can rest on serrated surface 14 when apparatus 10 is empty.

Small game animals and fish can be secured in apparatus 10 or removed in a matter of seconds. Apparatus 10 can be made in different sizes to accomodate different sizes of animals or fish.

This invention provides for an inexpensive apparatus for holding small game animals or fish during skinning, scaling or butchering, and the apparatus is inexpensive to manufacture and simple to maintain and operate.

The invention in its broader aspects is not limited to the specific details shown and described, and departures may be made from such details without departing from the principles of the invention and without sacrificing its chief advantages.

What is claimed is:

1. Apparatus for holding small game animals or fish during skinning, scaling or butchering operations, said apparatus comprising:
   a support member defining an upper serrated surface;
   a first arm member, defining a first lower serrated surface, pivotally mounted to said support member for enabling selective positioning of said serrated surfaces in juxtaposed relationship with each other;
   a second arm member, defining a second lower serrated surface, pivotally mounted to said support member for enabling selective positioning of said upper serrated surface and said second lower serrated surface in juxtaposed relationship with each other;
   a third arm member pivotally attached to said first arm member; and
   a fourth arm member pivotally attached to said second arm member and to said third arm member, whereby movement of said members in relationship to each other enlarges or diminishes the size of a triangular opening bounded by said serrated surfaces.

2. Apparatus as in claim 1 further including means in operative relationship with said support member and with a predetermined one of said first or second arm members for limiting the range of relative movement between said upper serrated surface and said lower serrated surfaces.

3. Apparatus as in claim 2 wherein said support member includes:
   a first element projecting upwardly from a first end of said support member;
   a second element projecting upwardly from a second end of said support member;
   said first element and said first arm member connected in pivotal relationship with each other; and
   said second element and said second arm member connected in pivotal relationship with each other.

4. Apparatus as in claim 3 wherein said third arm member defines a first notch therein and wherein said fourth arm member defines a second notch therein whereby said first notch contacts said first element and said second notch contacts said second element when said members are moved in relationship to each other to form the largest possible triangular opening bounded by said serrated surfaces.

5. Apparatus as in claim 4 wherein said upper serrated surface extends between said first and second elements.

6. Apparatus as in claim 5 wherein said first lower serrated surface extends between a first end of said first arm member and a position on said first arm member adjacent to where said first arm member is pivotally connected to said first element.

7. Apparatus as in claim 6 wherein said second lower serrated surface extends between a first end of said second arm member and a position on said second arm member adjacent to where said second arm member is pivotally connected to said second element.

8. Apparatus as in claim 2 wherein said support member further defines an opening in predetermined position with respect to said upper serrated surface and wherein said movement limiting means include a nail or screw positioned within said opening for contacting said first lower serrated surface when said members are moved into predetermined positions with respect to each other.

9. Apparatus as in claim 1 further including means pivotally connected to said third and fourth arm members for suspending said apparatus from a support.

* * * * *